United States Patent
Gilels et al.

(10) Patent No.: US 8,016,313 B2
(45) Date of Patent: Sep. 13, 2011

(54) TOW RACK

(76) Inventors: Jerome J. Gilels, Dallas, TX (US);
William H. Lee, Caddo Mills, TX (US)

( * ) Notice: Subject to any disclaimer, the term of this patent is extended or adjusted under 35 U.S.C. 154(b) by 51 days.

(21) Appl. No.: 12/566,484

(22) Filed: Sep. 24, 2009

(65) Prior Publication Data
US 2010/0072727 A1    Mar. 25, 2010

Related U.S. Application Data

(60) Provisional application No. 61/099,603, filed on Sep. 24, 2008.

(51) Int. Cl.
*B62D 53/04*    (2006.01)
(52) U.S. Cl. ........................................................ 280/402
(58) Field of Classification Search ................... 280/402; 410/2, 3; 414/462
See application file for complete search history.

(56) References Cited

U.S. PATENT DOCUMENTS

| | | | |
|---|---|---|---|
| 3,740,074 A | 6/1973 | Coil | |
| 5,145,308 A * | 9/1992 | Vaughn et al. | 414/462 |
| 5,620,197 A * | 4/1997 | Howes | 280/402 |
| 5,697,629 A * | 12/1997 | Guild | 280/402 |
| 5,938,226 A | 8/1999 | Transchel | |
| 5,984,339 A | 11/1999 | Guild | |
| 6,099,012 A * | 8/2000 | Mortimer | 280/402 |
| 6,581,954 B2 | 6/2003 | Chadwick | |
| 6,651,996 B1 * | 11/2003 | Allemang | 280/402 |
| 6,682,292 B2 | 1/2004 | Estes | |
| D584,195 S * | 1/2009 | Collier et al. | D12/162 |
| 7,537,234 B2 | 5/2009 | McClellan | |
| 7,552,936 B1 | 6/2009 | Berry | |
| 7,584,980 B2 * | 9/2009 | Thompson | 280/402 |
| 7,661,693 B1 * | 2/2010 | Lipski | 280/491.5 |

FOREIGN PATENT DOCUMENTS

| | | |
|---|---|---|
| CA | 2193332 | 6/1998 |
| GB | 2 309 209 | 7/1997 |
| GB | 2 318 332 | 4/1998 |

* cited by examiner

*Primary Examiner* — Tony H. Winner
(74) *Attorney, Agent, or Firm* — Munsch Hardt Kopf & Harr, P.C.

(57) ABSTRACT

A tow rack comprises a tongue releasably couplable to a towing vehicle and a beam assembly having a cradle for securing therein a tire of a towed vehicle. The beam assembly is couplable to the tongue and horizontally pivotable relative to the tongue. The beam assembly also comprises an anti-pivot mechanism to selectively prevent horizontal pivoting of the beam assembly relative to the tongue.

20 Claims, 4 Drawing Sheets

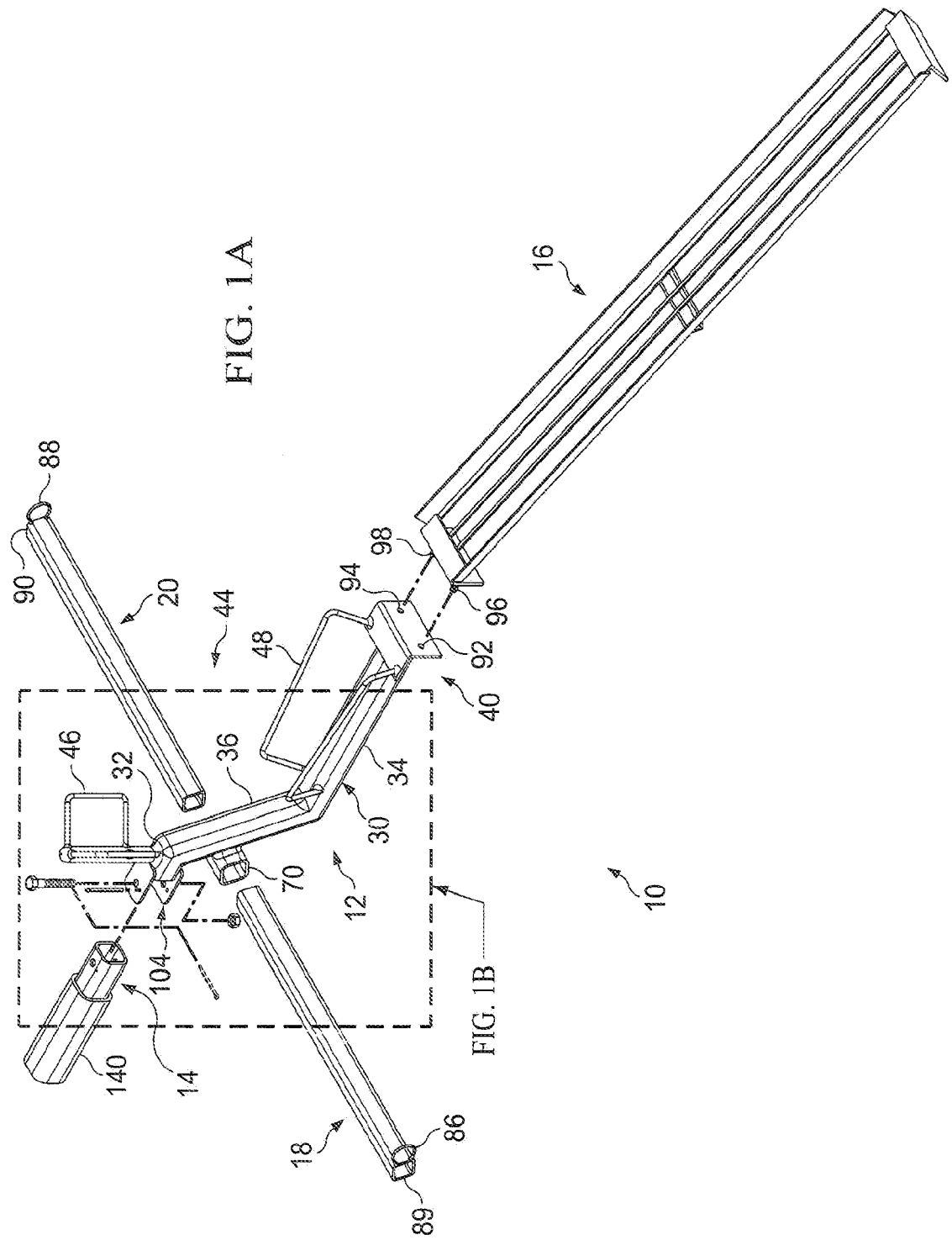

TOW RACK

CROSS-REFERENCE TO RELATED PATENT APPLICATIONS

This patent application claims the benefit of U.S. Provisional Patent Application No. 61/099,603, filed Sep. 24, 2008, the teachings and disclosure of which are hereby incorporated in their entireties by reference thereto.

BACKGROUND

Tow racks are used for towing motorcycles and other types of vehicles behind a towing vehicle (e.g., an automobile or truck). Some tow racks include lower arms for supporting one of the tires of the towed vehicle while another tire of the towed vehicle is in rolling contact with the ground surface.

BRIEF DESCRIPTION OF THE DRAWINGS

FIG. 1A is a diagram illustrating an exploded view of an embodiment of a tow rack;

DETAILED DESCRIPTION OF THE DRAWINGS

Figure 1B:
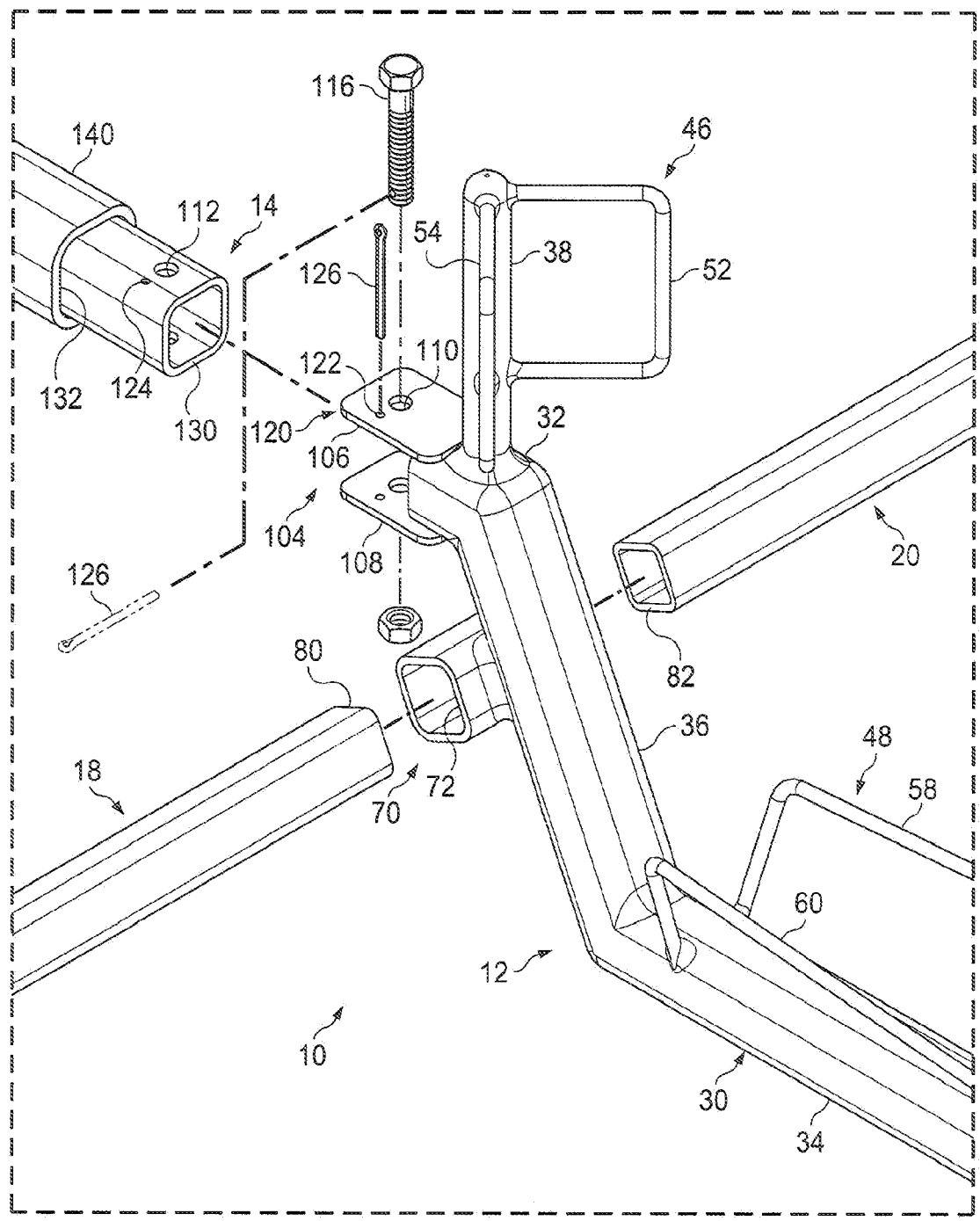
FIG. 1B is a diagram illustrating an enlarged exploded view of a portion of the tow rack illustrated in FIG. 1A.

FIGS. 1A and 1B are diagrams illustrating an exploded view of an embodiment of a tow rack 10. In the embodiment illustrated in FIGS. 1A and 1B, tow rack 10 is used for towing a vehicle, such as a motorcycle or other type of vehicle, behind a towing vehicle, such as an automobile, truck or other type of vehicle. In the embodiment illustrated in FIGS. 1A and 1B, tow rack 10 comprises a beam assembly 12 for supporting the towed vehicle, a tongue 14 for selectively coupling beam assembly 12 to a towing vehicle, a ramp 16 and cross bars 18 and 20.

In the embodiment illustrated in FIGS. 1A and 1B, beam assembly 12 comprises a main beam 30 having an upper horizontal portion 32, a lower horizontal portion 34, and an angled portion 36 interposed between upper portion 32 and lower portion 34. A forward portion of main beam 30 also comprises a riser 38 extending upwardly in a generally vertical direction from upper portion 32. Main beam 30 also comprises a ramp mount 40 located at a rearward portion or end of lower portion 34.

In the embodiment illustrated in FIGS. 1A and 1B, beam assembly 12 also comprises a cradle assembly 44 having an upper cradle 46 and a lower cradle 48. Upper cradle 46 is located on riser 38 and includes a pair of u-shaped bars 52 and 54 extending rearwardly and at an outwardly angled direction relative to each other to form a generally v-shaped cradle 46 for receiving a portion of a tire of the towed vehicle therein. Lower cradle 48 is located on lower portion 34 of main beam 30 and also includes a pair of u-shaped bars 58 and 60 extending upwardly from lower portion 34 and outwardly in angled relationship to each other for receiving a portion of a tire of a towed vehicle therein. It should be understood that the angular relationship between bars 52 and 54 and the angular relationship between bars 58 and 60 may be varied (e.g., to accommodate different sizes of tires of the towed vehicle). In the embodiment illustrated in FIGS. 1A and 1B, bars 52 and 54 and bars 58 and 60 comprise cylindrical rods welded to riser 38 and lower portion 34, respectively. However, it should be understood that cradles 46 and 48 may be constructed from other types and/or shapes of materials and attached to respective riser 38 and lower portion 34 using different methods (e.g., bolts, clips, etc.).

In the embodiment illustrated in FIGS. 1A and 1B, beam assembly 12 also comprises a cross bar receiver 70 located on angled portion 36 of main beam 30 and extending generally in a transverse direction relative to angled portion 36. Cross bar receiver 70 includes an opening 72 at each end thereof for receiving therein cross bars 18 and 20. For example, as best illustrated in FIG. 1B, in some embodiments, cross bar receiver 70 is configured having a generally rectangular shape with a rectangular-shaped opening 70 at each end thereof to accommodate and receive therein ends 80 and 82 of cross bars 18 and 20, respectively. However, it should be understood that other shapes and/or other methods of attachment may be used for selectively securing cross bars 18 and 20 to cross bar receiver 70 (e.g., fasteners, pins, clips, etc.). In FIGS. 1A and 1B, two cross bars 18 and 20 are illustrated; however, it should be understood that a greater or fewer quantity of cross bars may be used.

As illustrated in FIG. 1A, cross bars 18 and 20 each comprise a cross bar ring 86 and 88 located at ends 89 and 90 of cross bars 18 and 20, respectively, opposite ends 80 and 82. As will be described in further detail below, rings 86 and 88 are used to secure the towed vehicle to tow rack 10 via one or more tie straps.

In the embodiment illustrated in FIG. 1A, ramp mount 40 includes a pair of openings 92 and 94 for receiving therein a pair of corresponding studs 96 and 98 located on ramp 16 for selectively coupling ramp 16 to a rearward portion of beam assembly 12. However, it should be understood that other methods and/or devices may be used to facilitate ready attachment and detachment of ramp 16 relative to beam assembly 12 (e.g., a complementary-shaped guide, tongue and groove engagement, clips, etc.).

In the embodiment illustrated in FIGS. 1A and 1B, forward end of beam assembly 12 comprises a clevis 104 formed from a pair of spaced apart plates 106 and 108. In some embodiments, plates 106 and 108 are welded to upper and lower portions of upper portion 32 of main beam 30; however, it should be understood that plates 106 and 108 may be otherwise secured to main beam 30. The size of spacing between plates 106 and 108 is configured to receive therebetween a rearward portion of tongue 14 to enable pivotal movement of beam assembly 12 relative to tongue 14 in a generally horizontal direction. For example, in the embodiment illustrated in FIGS. 1A and 1B, clevis 104 comprises an opening 110 extending through plates 106 and 108 to align with an opening 112 formed in tongue 14 to receive a hinge bolt 116 therethrough. In the embodiment illustrated in FIGS. 1A and 1B, tow rack 10 also comprises an anti-pivot mechanism 120 to selectively prevent pivotal movement of beam assembly 12 relative to tongue 14. For example, in FIGS. 1A and 1B, anti-pivot mechanism 120 comprises an anti-pivot aperture 122 formed in plates 106 and 108 and located to correspond and/or align with an anti-pivot aperture 124 formed in tongue 14 for selectively receiving therein a linchpin 126. Linchpin 126 may be selectively inserted into and removed from apertures 122 and 124 to prevent or enable, respectively, pivotal movement of beam assembly 12 relative to tongue 14. In some embodiments, when not used to prevent pivotal movement of beam assembly 12 relative to tongue 14, linchpin 126 may be coupled to hinge bolt 116 to secure hinge bolt 116 relative to clevis 104 and tongue 14 (best illustrated in FIG. 1B). Further, in the embodiment illustrated in FIGS. 1A and 1B, aperture 122 extends through both plates 106 and 108; however, it should be understood that aperture 122 may be omitted from one of the plates, for example, omitted from plate 108, such that linchpin 126 extends through one of plates 106 and 108 and into a portion of tongue 14.

In FIGS. 1A and 1B, an end 130 of tongue 14 is configured to engage and be coupled to clevis 104 of beam assembly 12 and an opposite end 132 of tongue 14 is configured to selectively couple with a hitch receiver 140 of a towing vehicle. Tongue 14 and hitch receiver 140 may be releasably coupled thereto using a variety of methods and/or attachment mechanisms.

Figure 2:
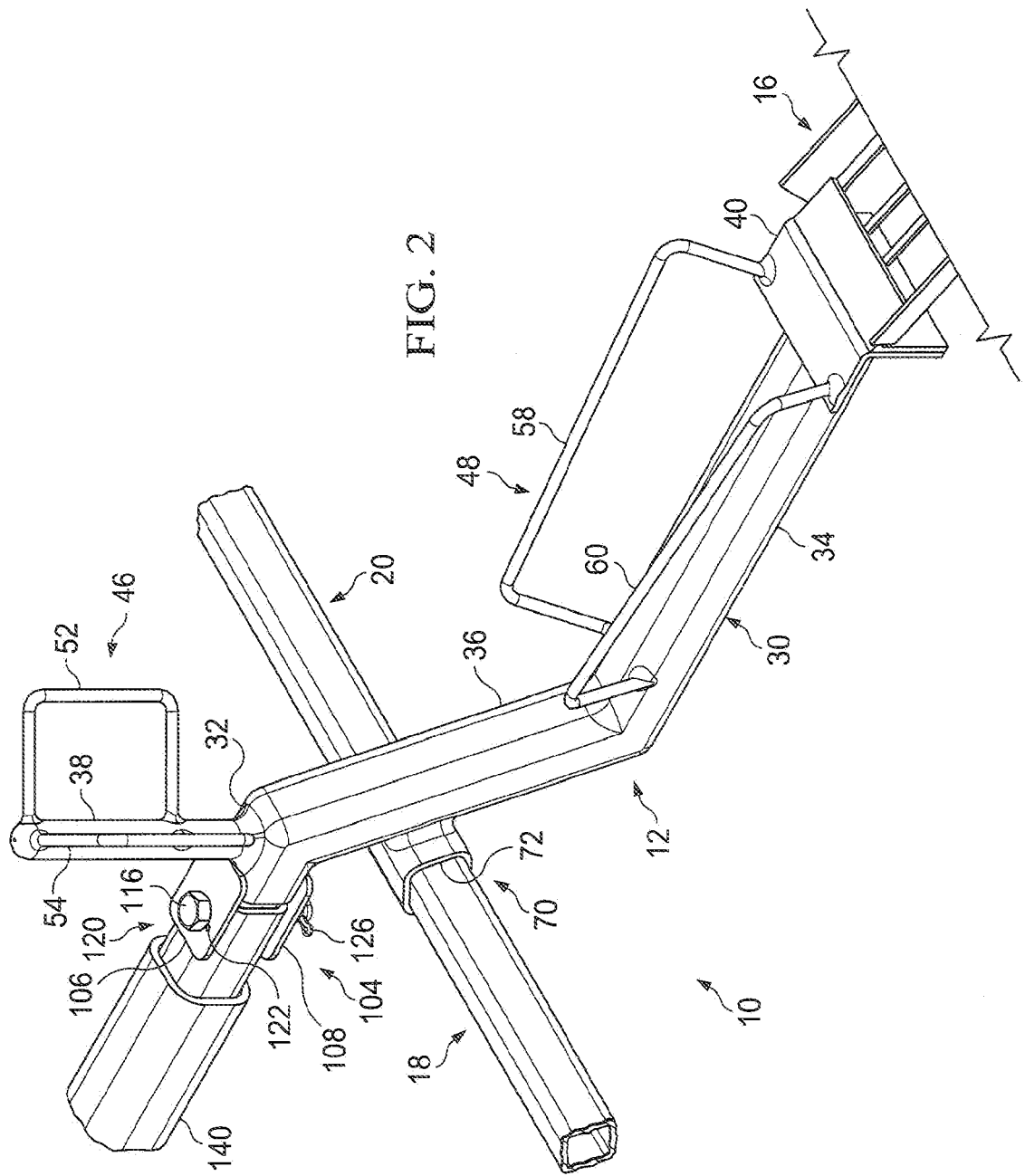
FIG. 2 is a diagram illustrating an assembled view of the tow rack of FIGS. 1A and 1B.

FIG. 2 is a diagram illustrating an assembled view of tow rack 10. In the embodiment illustrated in FIG. 2, cross bars 18 and 20 have been inserted into openings 72 of cross bar receiver 70. In some embodiments, tie straps coupled to rings 86 and 88 (FIG. 1A) and various portions of a towed vehicle provide sufficient tension to secure cross bars 18 and 20 to cross bar receiver 70. However, it should be understood that cross bars 18 and 20 may be selectively coupled to cross bar receiver 70 using other methods and/or devices such as, but not limited to, a hinge bolt and linchpin assembly, friction fit, clips, or other types of fasteners. Further, it should be understood that cross bars 18 and 20 may be otherwise configured to extend in a transverse direction relative to beam assembly 12 such as, but not limited to, a telescopic engagement with cross bar receiver 70.

In FIG. 2, ramp 16 has been selectively coupled to rearward portion of ramp mount 40 to facilitate rolling of a tire of a towed vehicle upwardly and onto beam assembly 12. To position the tire of a towed vehicle within upper cradle 46 and lower cradle 48. Ramp 16 may be formed from metal angles, round metal tubing or bars, or other types of materials and/or shapes to facilitate rolling of a tire of the towed vehicle from a ground surface upwardly and onto beam assembly 12.

In FIG. 2, clevis 104 has been coupled to tongue 14 via hinge bolt 116. Further, linchpin 126 has been inserted into hinge bolt 116, thereby enabling pivotal movement of beam assembly 12 relative to tongue 14. As described and illustrated above in connection with FIGS. 1A and 1B, linchpin 126 may be selectively removed from hinge bolt 116 and selectively inserted into 122 and 124 to temporarily and/or selectively prevent pivotal movement of beam assembly 12 relative to tongue 14 in the horizontal direction.

Figure 3:
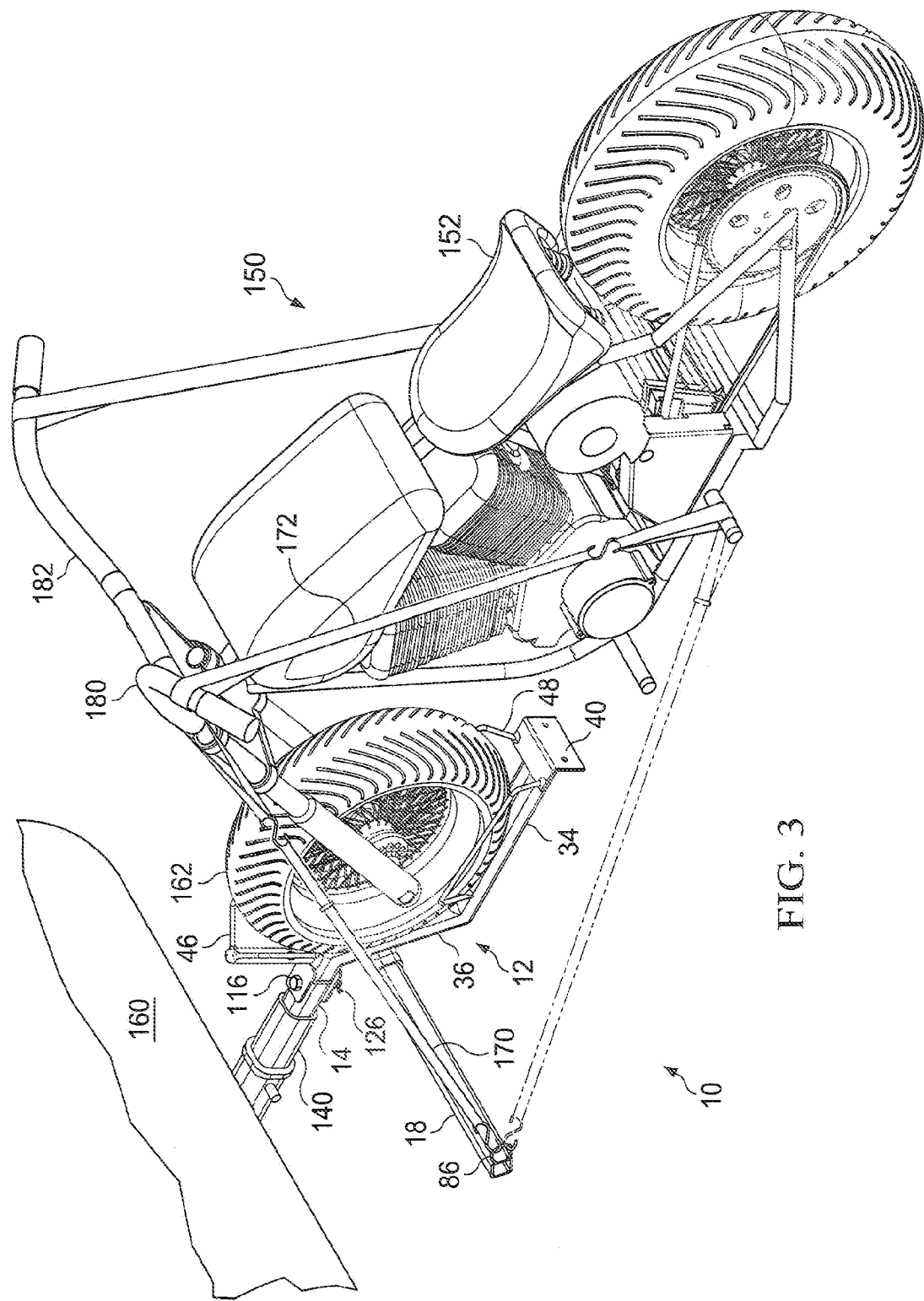
FIG. 3 is a diagram illustrating the tow rack of FIGS. 1A, 1B and 2 with a towed vehicle coupled thereto.

FIG. 3 is a diagram illustrating tow rack 10 of FIGS. 1A, 1B and 2 with a towed vehicle 150 coupled thereto. In FIG. 3, towed vehicle 150 comprises a motorcycle 152; however, it should be understood that other types of vehicles may be towed using tow rack 10. Further, in FIG. 3, ramp 16 has been removed from ramp mount 40.

In operation, tongue 14 is inserted into hitch receiver 140 on a towing vehicle 160 and secured in place with a hitch pin or other mechanism. Thereafter, apertures 110 and 112 in respective clevis 104 and tongue 14 (FIGS. 1A and 1B) are aligned and hinge bolt 116 is received therein to pivotally secure beam assembly 12 to tongue 14. Cross bars 18 and 20 are also inserted into cross bar receiver 70. To temporarily prevent pivoting of beam assembly 12 relative to tongue 14 and facilitate securing of towed vehicle 150 to tow rack 10, anti-pivot mechanism 120 is utilized by inserting linchpin 126 into anti-pivot apertures 122 and 124.

Ramp 16 may be selectively coupled to ramp mount 40 to facilitate rolling of a tire 162 of towed vehicle 150 onto beam assembly 12 and removed thereafter. For example, tire 162 of towed vehicle 150 may be rolled up ramp 16 until tire 162 abuts upper cradle 46 and/or riser 38 and is disposed within lower cradle 48. While beam assembly 12 and tongue 14 are held temporarily in a rigid position, a tie strap 170 is coupled to crossbar ring 86 on cross bar 18. Likewise, another tie strap is coupled to crossbar ring 88 on cross bar 20 (FIG. 1A). The ends of the tie straps may be equipped with hooks, clamps, or other connection devices to facilitate coupling with, for example, cross bar rings 86 and 88. With tie strap 170 secured to cross bar ring 86, the free end of tie strap 170 is extended upwardly and coupled to a left handlebar 180 of towed vehicle 150. Similarly, the tie strap coupled to cross bar ring 88 (FIG. 1A) is coupled to a right handlebar 182 of towed vehicle.

With the tie straps secured to handlebars 180 and 182 as indicated above, the rear of the towed vehicle 150 is aligned with the front of the towed vehicle 150. Linchpin 126 may be removed from anti-pivot apertures 122 and 124, thereby enabling beam assembly 12 to horizontally pivot relative to tongue 14. Once removed from anti-pivot apertures 122 and 124, linchpin 126 is inserted into hinge bolt 116.

In FIG. 3, an additional tie strap 172 is secured to left handlebar 180 and extends and is secured to a left, rear portion of towed vehicle 150 (e.g., a foot peg, a buddy foot peg, a rear portion of the frame of towed vehicle 150, etc.). For example, in FIG. 3, tie strap 170 is coupled to an inner portion of left handlebar 180 while tie strap 172 is coupled to an outer portion of left handlebar 180. Tie strap 172 extends rearwardly and downwardly from an outer portion of left handlebar 180 to a rearward, left portion of towed vehicle 150. Another tie strap may be coupled to an outer portion of right handlebar 182 (similar to as described above as for tie strap 172) and coupled to a right, rear portion of towed vehicle 150.

It should also be understood that the locations of securing tie straps to towed vehicle 150 may be altered and that a greater or fewer quantity of tie straps may be used. For example, as illustrated in FIG. 3, another tie strap may extend from cross bar rings 86 and 88 to a rear component of the towed vehicle 150 on the left and right side of towed vehicle 150. In addition, in some embodiments, the tie straps may form part of tow rack 10 (e.g., attached in a more permanent manner). After the tie straps have been secured to towed vehicle 150, ramp 16 (FIGS. 1A and 2) may be disengaged from ramp mount 40.

To remove tow rack 10 from towing vehicle 160, one or more of the above procedures may be performed in a reverse order. Also, in some embodiments, for convenient storage, crossbars 18 and 20 may be removed from beam assembly 12 and stowed. It should also be understood that various procedures indicated above may be performed in a different order than described or simultaneously. For example, the tie straps may be secured to cross bar rings 86 and 88 and temporarily secured to portions of upper cradle 46 until towed vehicle 150 is rolled up and onto beam assembly 12. Further, anti-pivot mechanism 120 may be engaged and disengaged at various times to facilitate securing of towed vehicle 150 to tow rack 10. Further, ramp 16 may be disengaged from ramp mount 40 at a different point in time during the process of securing towed vehicle 150 to tow rack 10.

What is claimed is:

1. A tow rack, comprising:
    means for supporting a tire of a towed vehicle;
    means for selectively securing the supporting means to a towing vehicle;
    means for pivotally coupling the supporting means to the securing means in a horizontal direction; and
    means for selectively preventing pivotal movement of the supporting means relative to the coupling means.

2. The tow rack of claim 1, further comprising means for enabling rolling of the tire of the towed vehicle onto the supporting means.

3. The tow rack of claim 2, further comprising means for selectively coupling the enabling means to the supporting means.

4. The tow rack of claim 1, further comprising means for selectively coupling a cross bar to the supporting means, the cross bar configured to receive a tie strap for securing the towed vehicle to the supporting means.

5. A tow rack, comprising:
a tongue releasably couplable to a towing vehicle;
a beam assembly having a cradle for securing therein a tire of a towed vehicle, the beam assembly couplable to the tongue and horizontally pivotable relative to the tongue, and wherein the beam assembly comprises an anti-pivot mechanism to selectively prevent horizontal pivoting of the beam assembly relative to the tongue; and
first and second cross bars selectively couplable to the beam assembly, the first and second cross bars extending in opposing directions and each configured to receive a tie strap for securing the towed vehicle to the beam assembly.

6. A tow rack, comprising:
a tongue releasably couplable to a towing vehicle;
a beam assembly having a cradle for securing therein a tire of a towed vehicle, the beam assembly couplable to the tongue and horizontally pivotable relative to the tongue, and wherein the beam assembly comprises an anti-pivot mechanism to selectively prevent horizontal pivoting of the beam assembly relative to the tongue and a clevis for receiving the tongue therein.

7. The tow rack of claim 5, wherein the anti-pivot mechanism comprises an aperture extending through at least a portion of the beam assembly and at least a portion of the tongue for receiving a pin therein.

8. The tow rack of claim 5, further comprising a ramp selectively couplable to the beam assembly to facilitate rolling of the tire onto the beam assembly and into the cradle.

9. The tow rack of claim 5, wherein the beam assembly comprises a receiver for selectively receiving a cross bar coupled thereto, the cross bar configured to receive a tie strap for securing the towed vehicle to the beam assembly.

10. The tow rack of claim 5, wherein the beam assembly is pivotally coupled to the tongue via a hinge bolt and a linchpin, and wherein the linchpin is usable to prevent the horizontal pivoting of the beam assembly relative to the tongue.

11. A tow rack, comprising:
a tongue releasably couplable to a towing vehicle;
a beam assembly having a cradle for securing therein a tire of a towed vehicle, the beam assembly couplable to the tongue and horizontally pivotable relative to the tongue, and wherein the beam assembly comprises an anti-pivot mechanism to selectively prevent horizontal pivoting of the beam assembly relative to the tongue and first and second plates spaced apart to receive and couple therebetween the tongue.

12. The tow rack of claim 11, wherein the anti-pivot mechanism comprises an aperture extending through at least a portion of the beam assembly and at least a portion of the tongue for receiving a pin therein.

13. The tow rack of claim 11, further comprising a ramp selectively couplable to the beam assembly to facilitate rolling of the tire onto the beam assembly and into the cradle.

14. The tow rack of claim 11, wherein the beam assembly comprises a receiver for selectively receiving a cross bar coupled thereto, the cross bar configured to receive a tie strap for securing the towed vehicle to the beam assembly.

15. The tow rack of claim 11, wherein the beam assembly is pivotally coupled to the tongue via a hinge bolt and a linchpin, and wherein the linchpin is usable to prevent the horizontal pivoting of the beam assembly relative to the tongue.

16. A tow rack, comprising:
a beam assembly having a cradle for receiving a tire of a towed vehicle therein;
a tongue for selectively coupling the beam assembly to a towing vehicle, the beam assembly pivotally couplable to the tongue in a horizontal direction;
a ramp couplable to the beam assembly to facilitate rolling of the tire onto the beam assembly, the ramp removable from the beam assembly after positioning of the tire in the cradle; and
wherein the beam assembly comprises first and second plates spaced apart to receive and couple therebetween the tongue.

17. The tow rack of claim 16, wherein the beam assembly comprises a stud for selectively coupling thereto the ramp.

18. The tow rack of claim 16, wherein the beam assembly comprises a cross bar receiver for selectively coupling a cross bar thereto, the cross bar configured to receive a tie strap for securing the towed vehicle to the beam assembly.

19. The tow rack of claim 16, wherein the beam assembly comprises an anti-pivot aperture for receiving a pin therein for selectively preventing pivotal movement of the beam assembly relative to the tongue.

20. The tow rack of claim 16, wherein the pin is removable from the anti-pivot aperture and couplable to a hinge bolt pin for securing the beam assembly to the tongue.

\* \* \* \* \*